July 1, 1958 W. L. WRIGHT 2,841,769

FREQUENCY MODULATED OSCILLATION GENERATORS

Filed July 6, 1954

Inventor:
William Lea Wright
By his attorneys:
Baldwin & Wight

United States Patent Office 2,841,769

Patented July 1, 1958

2,841,769

FREQUENCY MODULATED OSCILLATION GENERATORS

William Lea Wright, Great Baddow, England, assignor to Marconi's Wireless Telegraph Company Limited, London, England, a company of Great Britain Application July 6, 1954, Serial No. 441,431

Claims priority, application Great Britain July 8, 1953

8 Claims. (Cl. 332—24)

This invention relates to frequency modulated oscillation generators and more particularly to frequency modulated oscillation generators of the kind in which the frequency generated is varied i. e. modulated by varying the phase shift introduced in a positive feedback loop between output and input of an amplifier. For the sake of brevity frequency modulated oscillation generators of the kind to which the invention relates will hereinafter be termed modulated phase shift oscillation generators.

The invention is directed to a balanced valve system constituting a modulated phase shift oscillation generator having a high degree of stability in which feedback paths are wholly isolated from the control grid circuits of the valves, leaving the control grids free for use for linear modulation.

Reference will be made in the specification hereinafter following to the accompanying drawing, in which.

In order that the invention may be clearly understood the action of a modulated phase shift oscillation generator will first be described with reference to Fig. 1 of the accompanying drawing which shows such a generator in block diagram form.

Figure 1:
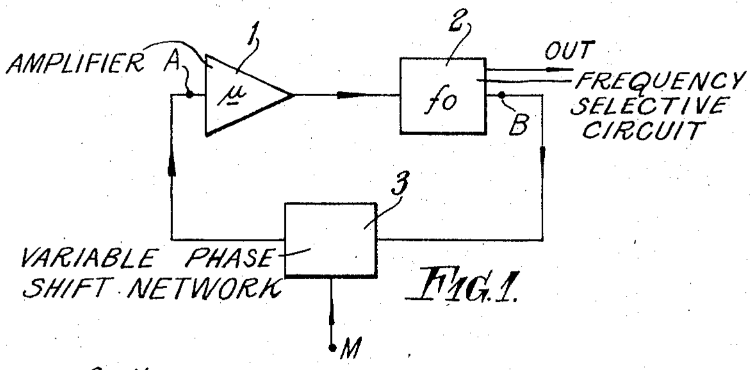
Fig. 1 is a block diagram explaining the theory of the invention.

Referring to Fig. 1 the arrangement therein shown comprises a frequency selective amplifying system connected with a positive feed-back loop in which is inserted a signal controlled phase shifting device. The block 1 represents an amplifier and the block 2 a frequency selective circuit—in the simplest case a parallel tuned circuit the two together constituting the frequency selective amplifying system. Let $\mu$ represent the gain of the amplifier and $f_0$ the resonant frequency i. e. the frequency at which there is zero phase change between the points A and B. A positive feed-back loop connects the point B back to the point A, this loop including a variable phase shift network or device 3 as known per se whose phase shift is dependent upon and controlled by a modulating signal applied at M. Frequency modulated oscillations are taken off from the output of the system 1, 2 as indicated at "out." Let the effective Q value of the system 1, 2 be $Q_A$.

With this arrangement if the phase shift introduced by the unit 3 is zero there will be zero phase shift round the loop at the frequency $f_0$ and the whole arrangement will therefore oscillate at this frequency. If now the phase shift introduced by the unit 3 is changed from zero to a real value $\phi_1$, there will be zero phase change round the loop if the phase from A to B is changed by $-\phi_1$, radians and the arrangement will oscillate at that frequency for which this occurs. The phase change $\phi$ produced in a tuned circuit of resonant frequency $f_0$ for a variation $\Delta f$ of applied frequency is given, to a close degree of approximation, by the equation, $$\tan \phi = -2Q\frac{\Delta f}{f_0}$$

(where Q is the Q value of the circuit) so long as $$\frac{\Delta f}{f_0}$$

is small. Accordingly the fractional frequency change $$\left(\frac{\Delta f_1}{f_0}\right)$$

required to produce the phase change of $-\phi_1$, radians is given by, $$\frac{\Delta f_1}{f_0} = \frac{1}{2Q_A} \tan \phi_1$$

In practice, in a circuit arrangement as shown in Fig. 1 the signal controlled variation of phase shift in the unit 3 is produced by employing said signal to control the effective mutual conductance of a pair of phase modulator valves whose mutual conductance, for the condition of zero phase shift, is $gm_0$ for each valve. If $\Delta gm$ is the total mutual conductance change produced by an applied modulating signal the corresponding phase shift, in an ordinary phase modulator, is $$\tan^{-1} K\frac{\Delta gm}{gm_0}$$

where K is a constant depending on the modulator. Accordingly we may write $$\frac{\Delta f}{f_0} = \frac{K}{2Q_A} \cdot \frac{\Delta gm}{gm_0} \text{ (to a close approximation)} \qquad (1)$$

Thus, for small deviations of frequency there is a very close approximation to linearity of relationship between $\Delta f$ and $\Delta gm$ while, for a given phase angle, the frequency deviation is inversely proportional to $Q_A$. There are, however, obvious practical limits to the extent to which the Q value can be reduced in order to produce increased frequency deviation for a given modulation input.

Known practical circuits operating as above described with reference to Fig. 1 are, however, complex and are difficult to design to give good linearity of modulation coupled with large frequency deviation and the present invention seeks to avoid these defects and to provide improved modulated phase shift oscillation generators which despite great economy and simplicity of construction and circuitry, shall be of excellent performance. As will be seen later the invention provides a modulated phase shift oscillation generator which, in its simplest form, comprises only two valves which perform the functions both of the unit 1 and the unit 3 of Fig. 1.

According to this invention a modulated phase shift oscillation generator comprises a pair of valves with a common anode circuit including a frequency selective network, a branched positive feed-back path from said common anode circuit to the cathodes of said valves, said path including part of a substantially aperiodic reactance-resistance network having a capacity branch and an inductance branch, said branches being of substantially equal reactive impedance at the frequency for which said frequency selective network is selective, and means for applying modulating potentials in phase opposition to two grids of said valve, one in each.

Preferably said valves are pentodes and negative feedback is provided from the common anode circuit in parallel to the suppressor grids of said valves.

Figure 2:
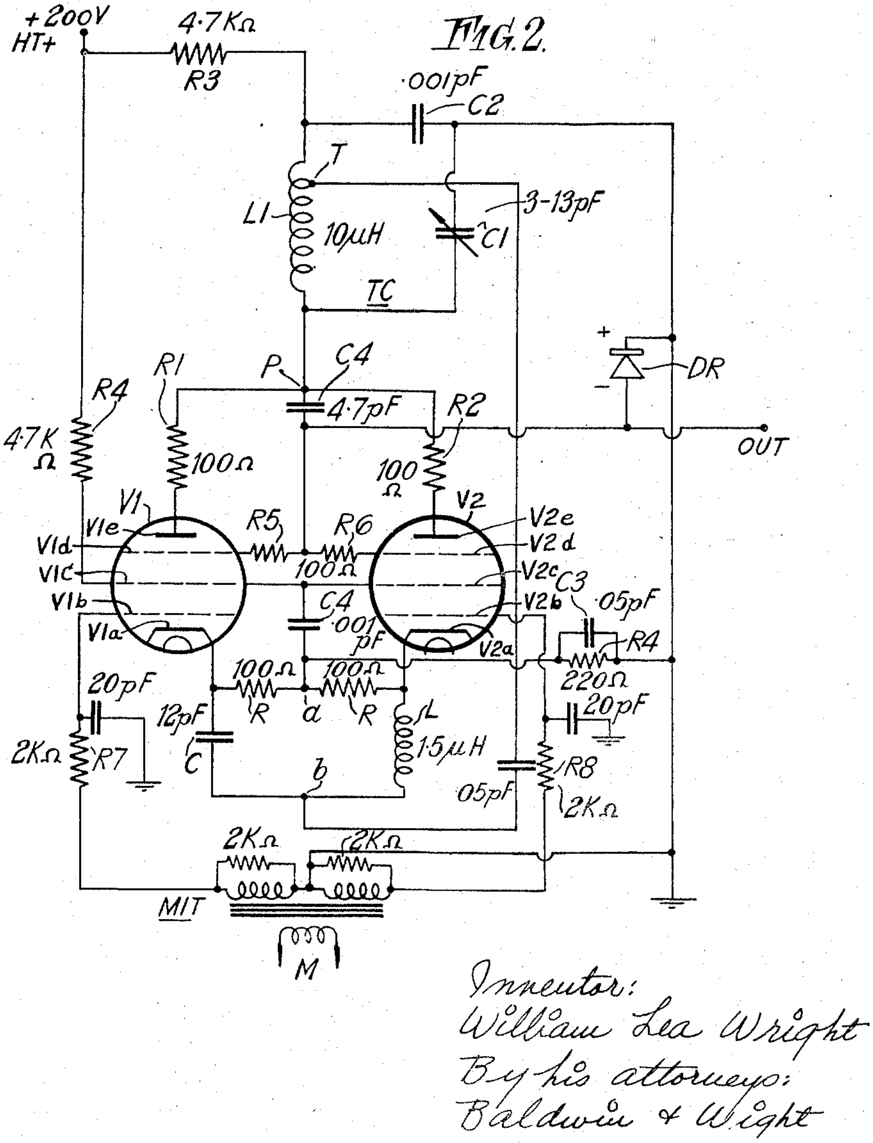
Fig. 2 is a typical circuit diagram embodying the principles of operation of the circuit of my invention as explained in connection with Fig. 1.

Fig. 2 of the accompanying drawing is a diagram of one embodiment of the invention. Typical practical values of the various components are indicated in conventional manner adjacent the representations thereof. An arrangement as shown in Fig. 2 and dimensioned as indicated will operate over a tuning range of about 9–11 mc./s., but of course these parameters and the dimensions given are by way of example only and are in no way limiting.

Referring to Fig. 2 there are two similar valves V1 V2 shown as pentodes, having their anodes V1*e* and V2*e* connected through like anti-parasitic resistances R1, R2 to a common point P which is connected to one end of a parallel tuned circuit TC comprising an inductance L1, a tuning condenser C1 and a fixed condenser C2. The junction of the elements C1, C2 is returned to earth and the junction of the elements L1 C2 is taken to high tension positive HT+ through a resistance R3. Positive feed-back is applied to the valves at the cathodes V1*a* and V2*a* thereof one end of the positive feed-back path extending from a suitable tap T on the inductance L1. The mutual inductance between the two portions into which inductance L1 is divided by the tap T should be large in order to give efficient transformer action. Tap T should be selected in a position as near the anode end, P, of the coil as possible consistent with maintaining sufficient loop gain to ensure continuous oscillation. With a large mutual inductance between the two portions of inductance L1 and a good selection of the position of the tap T a low Q value for the tuned circuit L1, C1 is obtained and consequently a large frequency deviation per unit change in mutual conductance $$\left(\frac{\Delta f}{\Delta gm}\right)$$

of the modulator valves, as will be evident from Equation 1 above. The feed-back path is branched into two, one including a capacity C (of value C) extending to the cathode V1*a* of the valve V1 and the other including and inductance L (of value L) extending to the cathode V2*a* of the valve V2. The cathodes V1*a* and V2*a* are connected together through resistances R (each of value R) the junction point of which is earthed through a capacity shunted resistance combination C3, R4. The two screen grids V1*c* and V2*c* are connected to this same junction point through a condenser C4 and receive a suitable screen grid potential through a resistance R4. The suppressor grids V1*d* and V2*d* are connected together through anti-parasitic resistances R5 R6 and their junction point is connected to the point P through a condenser C4. Modulating potential are applied at M through a modulation input transformer MIT and grid resistance R7 R8 to the control grids V1*b* and V2*b* of the valves in phase opposition.

The circuit values are so chosen that, at the resonant frequency $\omega_0/2\pi$ of the tuned circuit TC, $$\omega_0 L = \frac{1}{\omega_0 C} = nR$$

where *n* is any number, whole or fractional. If *n* is selected at unity the positive feedback circuit becomes aperiodic and presents a resistive impedance of R ohms across the points *a* and *b* at all frequencies.

The simplicity of the circuit of Fig. 2 will be noted and it will be observed that the application of radio frequency feedback to the cathodes V1*a* and V2*a* leaves the control grids V1*b* and V2*b* free for use for modulation. The application of the modulation to the control grids V1*b* and V2*b* is preferred as giving best linearity and sensitivity though it might be applied to the suppressor grids V1*d* and V2*d*.

The feed-back through condenser C4 to the suppressor grids V1*d* and V2*d* gives automatic control of the amplitude of oscillation, limiting said amplitude since the radio frequency feed to the suppressor grids V1*d* and V2*d* is in anti-phase with the anode current. In addition the amplitude of oscillation is limited by rectification of the applied radio frequency wave at the suppressor grids V1*d* and V2*d* which assume a negative potential of magnitude proportional to the radio frequency voltage appearing across the anode tuned circuit. This negative potential on the suppressor grids V1*d* and V2*d* reduces the mutual conductance of the valves and so limits the amplitude of oscillation. When automatic gain control is effected in this manner it is possible so to arrange the conditions that no grid current flows in the first grid circuit of either valve so that distortion of the modulating potentials applied between the first grid V1*b*, V2*b* and the cathode V1*a*, V2*a* of each valve is avoided.

If desired in order to improve rectification at the suppressor grids V1*d* and V2*d* a crystal diode or other rectifier DR may be connected as shown between the output lead to terminal "out" and earth. Alternatively additional rectification may be provided by connecting the output lead direct to the grid of the following valve.

A modulated phase shift oscillation generator in accordance with this invention can readily be designed to give a very high degree of linearity as regards modulation—so much so, indeed, as to render it satisfactory for use as a drive unit in a multi-channel frequency modulated radio telephone transmitter, where, as is well known, a high order of modulation linearity is a very important practical requirement.

I claim:

1. A modulated phase shift oscillation generator comprising a pair of valves with a common anode circuit including a frequency selective network, a source of anode voltage, a branched positive feedback path from said common anode circuit to the cathodes of said valves, said path including part of a substantially aperiodic reactance-resistance network of substantially linear phase-frequency characteristics having a capacity branch and an inductance branch, said branches being of substantially equal reactive impedances at the frequency for which said frequency selective network is selective, and means for applying modulating potentials in phase opposition to two grids of said valves, one in each.

2. A generator as set forth in claim 1, wherein said valves are pentodes and wherein negative feedback is provided from the common anode circuit in parallel to the suppressor grids of said valves.

3. A generator as set forth in claim 1, wherein the capacity branch is connected to a cathode of one of said valves and has a capacitance of value C, the inductance branch being connected to the cathode of the other of said valves, and having an inductance of value L, the cathodes of the two valves being connected together by two series connected resistances each of value R and the junction point of the two resistances being earthed, and wherein the circuit values are so chosen that at said frequency, $\omega/2\pi$, $$\omega L = \frac{1}{\omega C} = nR$$

*n* being any number, whole or fractional.

4. A generator as set forth in claim 1, wherein the capacity branch is connected to a cathode of one of said valves and has a capacitance of value C, the inductance branch being connected to the cathode of the other of said valves, and having an inductance of value L, the cathodes of the two valves being connected together by two series connected resistances each of value R and the junction point of the two resistances being earthed, and wherein the circuit values are so chosen that at said frequency, $\omega/2\pi$, $$\omega L = \frac{1}{\omega C} = nR$$

wherein *n* is unity.

5. A generator as set forth in claim 1, wherein the frequency selective network includes an inductance connected between the anodes and the positive side of the source of anode voltage and having a tapping point to which the common end of the positive feedback path is connected, the tapping point being positioned as near the anode end of the inductance as possible consistent with maintaining sufficient loop gain to ensure continuous oscillation.

6. A generator as set forth in claim 1 wherein said valves are pentodes and negative feedback is provided from the common anode circuit in parallel to the suppressor grids of said valves, and wherein the modulating potentials are applied to the control grids of said valves.

7. A generator as set forth in claim 1 wherein said valves are pentodes and negative feedback is provided from the common anode circuit in parallel to the suppressor grids of said valves, and wherein the modulating potentials are applied to the control grids of said valves, said control grids having a bias voltage connected thereto in order to insure that no grid current shall flow in the control grid circuit of either valve.

8. A generator as set forth in claim 1 wherein said valves are pentodes and negative feedback is provided from the common anode circuit in parallel to the suppressor grids of said valves, and wherein the modulating potentials are applied to the control grids of said valves, said control grids having a bias voltage connected thereto in order to insure that no grid current shall flow in the control grid circuit of either valve, and having an output lead connected to the suppressor grids, there being a rectifier connected between the output lead and earth.

References Cited in the file of this patent

UNITED STATES PATENTS

| | | |
|---|---|---|
| 2,374,000 | Crosby | Apr. 17, 1945 |
| 2,388,098 | Usselman | Oct. 30, 1945 |
| 2,555,373 | Romander | June 5, 1951 |